United States Patent
Tanaka (10) Patent No.: US 10,261,401 B2
(45) Date of Patent: Apr. 16, 2019

(54) LIGHT SOURCE DEVICE AND PROJECTION DISPLAY APPARATUS

(71) Applicant: Panasonic Intellectual Property Management Co., Ltd., Osaka (JP)

(72) Inventor: Takaaki Tanaka, Osaka (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 0 days.

(21) Appl. No.: 16/034,338

(22) Filed: Jul. 12, 2018

(65) Prior Publication Data

US 2019/0041735 A1 Feb. 7, 2019

(30) Foreign Application Priority Data

Aug. 1, 2017 (JP) .................................. 2017-149244
May 14, 2018 (JP) .................................. 2018-093025

(51) Int. Cl.
*H04N 9/31* (2006.01)
*G03B 21/20* (2006.01)

(52) U.S. Cl.
CPC ....... *G03B 21/2013* (2013.01); *G03B 21/204* (2013.01); *H04N 9/3105* (2013.01); *H04N 9/3164* (2013.01)

(58) Field of Classification Search
CPC . G03B 21/2013; G03B 21/204; H04N 9/3105
USPC ......................................................... 362/84
See application file for complete search history.

(56) References Cited

U.S. PATENT DOCUMENTS

| | | | | |
|---|---|---|---|---|
| 2012/0002173 A1* | 1/2012 | Akiyama | ........... | G03B 21/2013 353/30 |
| 2012/0268917 A1* | 10/2012 | Kitano | ................. | H04N 9/3105 362/84 |
| 2015/0049307 A1* | 2/2015 | Kashihara | .......... | G02B 27/1046 353/20 |
| 2015/0301438 A1* | 10/2015 | Akiyama | ............. | G03B 21/208 353/20 |

(Continued)

FOREIGN PATENT DOCUMENTS

| JP | 2009-122430 | 6/2009 |
|---|---|---|
| JP | 2012-128340 | 7/2012 |

(Continued)

*Primary Examiner* — Bryon T Gyllstrom
(74) *Attorney, Agent, or Firm* — Wenderoth, Lind & Ponack, L.L.P.

(57) ABSTRACT

A light source device has a blue solid-state light source, a red solid-state light source, a first retardation plate, a dichroic mirror, a phosphor plate, a second retardation plate, and a reflector. The first retardation plate causes light from the blue solid-state light source to have a phase difference. The dichroic mirror provides the light from the blue solid-state light source with polarization separation, receiving the light from the blue solid-state light source and light from the red solid-state light source in an identical direction. The phosphor plate emits fluorescence light, excited by one light, separated by the dichroic mirror. The second retardation plate converts, into circular polarization, polarization of the light from the red solid-state light source and other light, separated by the dichroic mirror. The reflector reflects light converted into circular polarization by being passed through the second retardation plate.

15 Claims, 5 Drawing Sheets

(56) References Cited

U.S. PATENT DOCUMENTS

| | | | |
|---|---|---|---|
| 2015/0378249 A1* | 12/2015 | Akiyama | G03B 21/2013 |
| | | | 353/31 |
| 2016/0147136 A1* | 5/2016 | Nojima | G03B 21/204 |
| | | | 353/98 |
| 2016/0241822 A1* | 8/2016 | Takagi | H04N 9/3111 |
| 2017/0123300 A1* | 5/2017 | Shishido | G02B 3/0062 |
| 2017/0205692 A1* | 7/2017 | Aoki | G03B 21/16 |
| 2017/0208300 A1* | 7/2017 | Toyooka | G02B 5/3083 |

FOREIGN PATENT DOCUMENTS

| | | |
|---|---|---|
| JP | 2012-234161 | 11/2012 |
| JP | 2016-170390 | 9/2016 |

\* cited by examiner

LIGHT SOURCE DEVICE AND PROJECTION DISPLAY APPARATUS

BACKGROUND

1. Technical Field

The present disclosure relates to a projection display apparatus that provides an image formed on a compact light valve with illumination light and magnifies and projects the image on a screen by a projection lens.

2. Description and the Related Art

For a projection display apparatus using a mirror-deflection type micromirror device (DMD) and a liquid crystal panel as a light valve, many light source devices have been disclosed. Such a light source device employs, for example, long-life semiconductor laser and a solid-state light source of a light-emitting diode. Among others, Patent Literature 1 discloses a light source device using a blue solid-state light source and a red solid-state light source. The light source device offers wide color gamut and high efficiency (see Japanese Unexamined Patent Application Publication No. 2012-234161).

SUMMARY

According to the present disclosure, the structure—in which light fed from a blue solid-state light source and a red solid-state light source is collected and combined in a single optical system—allows a light source device and a projection display apparatus to have a compact body, a wide color gamut, and high color purity.

The light source device of the present disclosure has a blue solid-state light source, a red solid-state light source, a first retardation plate, a dichroic mirror, a phosphor plate, a second retardation plate, and a reflector. The first retardation plate causes light from the blue solid-state light source to have a phase difference. The dichroic mirror provides the light from the blue solid-state light source with polarization separation, receiving the light from the blue solid-state light source and light from the red solid-state light source in an identical direction. The phosphor plate emits fluorescence light, excited by one light, separated by the dichroic mirror, of the light from the blue solid-state light source. The second retardation plate converts, into circular polarization, polarization of the light from the red solid-state light source and other light, separated by the dichroic mirror, of the light from the blue solid-state light source. The reflector reflects light converted into circular polarization by being passed through the second retardation plate.

The projection display apparatus of the present disclosure has the light source device described above, an illumination optical system that collects light from the light source device and illuminates a region to be illuminated with the light, an image forming element that forms an image in response to an image signal, and a projection lens that magnifies and projects the image formed by the image forming element.

According to the present disclosure, the structure—in which the light fed from a blue solid-state light source and a red solid-state light source is collected and combined in a single optical system—allows a light source device to have a compact body, a wide color gamut, and high color purity. The structure accordingly provides a projection display apparatus with a compact, long-life structure having a wide color gamut.

DETAILED DESCRIPTION OF PREFERRED EMBODIMENTS

Hereinafter, an exemplary embodiment will be described with reference to the accompanying drawings.

First Exemplary Embodiment

Figure 1:
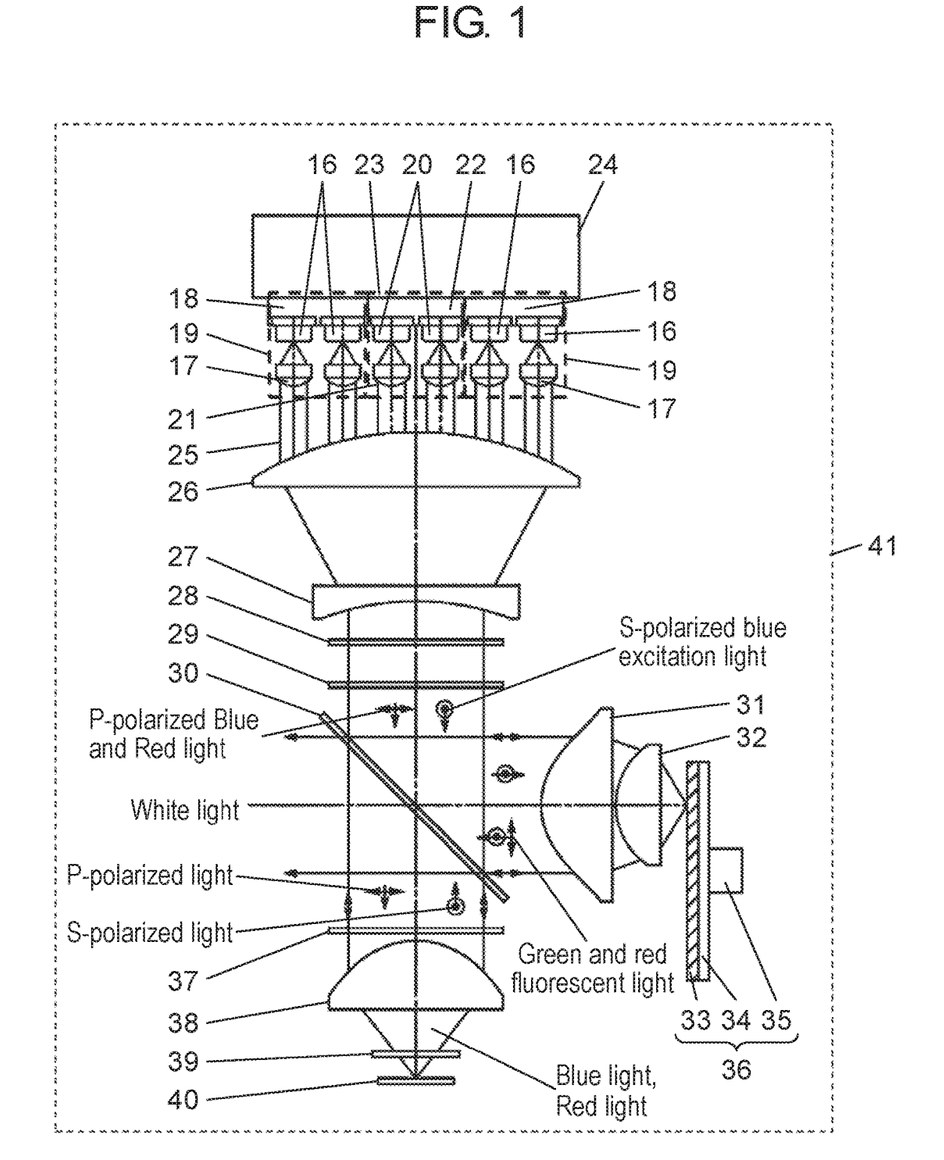
FIG. 1 is a block diagram of a light source device in accordance with a first exemplary embodiment.

FIG. 1 is a block diagram of a light source device in accordance with the first exemplary embodiment. Light source device 41 has blue solid-state light source unit 19 and red solid-state light source unit 23. Blue solid-state light source unit 19 is formed of blue semiconductor laser 16 (as a blue solid-state light source), collimate lens 17, and heat radiating plate 18. Red solid-state light source unit 23 is formed of red semiconductor laser 20 (as a red solid-state light source), collimate lens 21 and heat radiating plate 22. Heat radiating plate 18 of blue solid-state light source unit 19 and heat radiating plate 22 of red solid-state light source 23 are joined to heat sink 24. Lens 26, lens 27, first diffusion plate 28, first retardation plate 29, and dichroic mirror 30 are disposed in the order named, in the travelling direction of the light fed from blue solid-state light source unit 19 and red solid-state light source unit 23.

Condenser lenses 31 and 32 collect light reflected by dichroic mirror 30 and apply the light onto phosphor layer 33 of phosphor plate 36 to excite phosphor; at the same time, condenser lenses 31 and 32 collect the fluorescence light obtained by the excitation. Phosphor plate 36 has aluminum substrate 34 and motor 35. Aluminum substrate 34 has a reflection coating and phosphor layer 33 thereon. In the travelling direction of the light that passes through dichroic mirror 30, quarter wavelength plate 37 (as a retardation plate), condenser lens 38, second diffusion plate 39, and reflector 40 are disposed in the order named. FIG. 1 shows light fluxes 25 (whose travelling direction is shown by a single directional arrow) fed from the solid-state light source and also shows a deflecting direction of the light coming into dichroic mirror 30 and the light going out of dichroic mirror 30.

Blue solid-state light source unit 19 has a structure in which squarely-arranged eight (two by four) blue semiconductor lasers 16 and collimate lenses 17 are disposed in a matrix at regular intervals on heat radiating plate 18. Two blue solid-state light source units 19 are disposed on the both sides of red solid-state light source unit 23. Similarly, red solid-state light source unit 23 has a structure in which squarely-arranged eight (two by four) red semiconductor lasers 20 and collimate lenses 21 are disposed in a matrix at regular intervals on heat radiating plate 22. Red solid-state light source unit 23 is located at the center so as to be sandwiched between two blue solid-state light source units 19. Heat sink 24 keeps blue semiconductor laser 16 and red semiconductor laser 20 cool.

Blue semiconductor laser 16 emits linearly polarized blue light with a wavelength width from 447 nm to 462 nm. Each blue semiconductor laser 16 is disposed so that the polarized light fed from the blue semiconductor laser 16 becomes S-polarized light to the incident plane of dichroic mirror 30. Red semiconductor laser 20 emits linearly polarized red light with a wavelength width from 633 nm to 649 nm. Each red semiconductor laser 20 is disposed so that the polarized light fed from the red semiconductor laser 20 becomes P-polarized light to the incident plane of dichroic mirror 30.

The light fed from blue semiconductor lasers 16 is collected by respective collimate lens 17 and converted into parallel light fluxes 25. Fluxes 25 are reduced each diameter by convex lens 26 and concave lens 27 and enter into first diffusion plate 28.

Similarly, the light fed from red semiconductor lasers 20 is collected by respective collimate lens 21 and converted into parallel light fluxes 25. Fluxes 25 are reduced each diameter by convex lens 26 and concave lens 27 and enter into first diffusion plate 28.

First diffusion plate 28 has a diffusing surface of a microscopic lenticular structure formed on a glass substrate and diffuses incident light. The diffusion angle (as the half-value angle width that corresponds to 50% of maximum intensity of diffusion light) of first diffusion plate 28 is small (approximately 4 degrees) and maintains polarization characteristics. The light coming from first diffusion plate 28 enters into first retardation plate 29.

Figure 2:
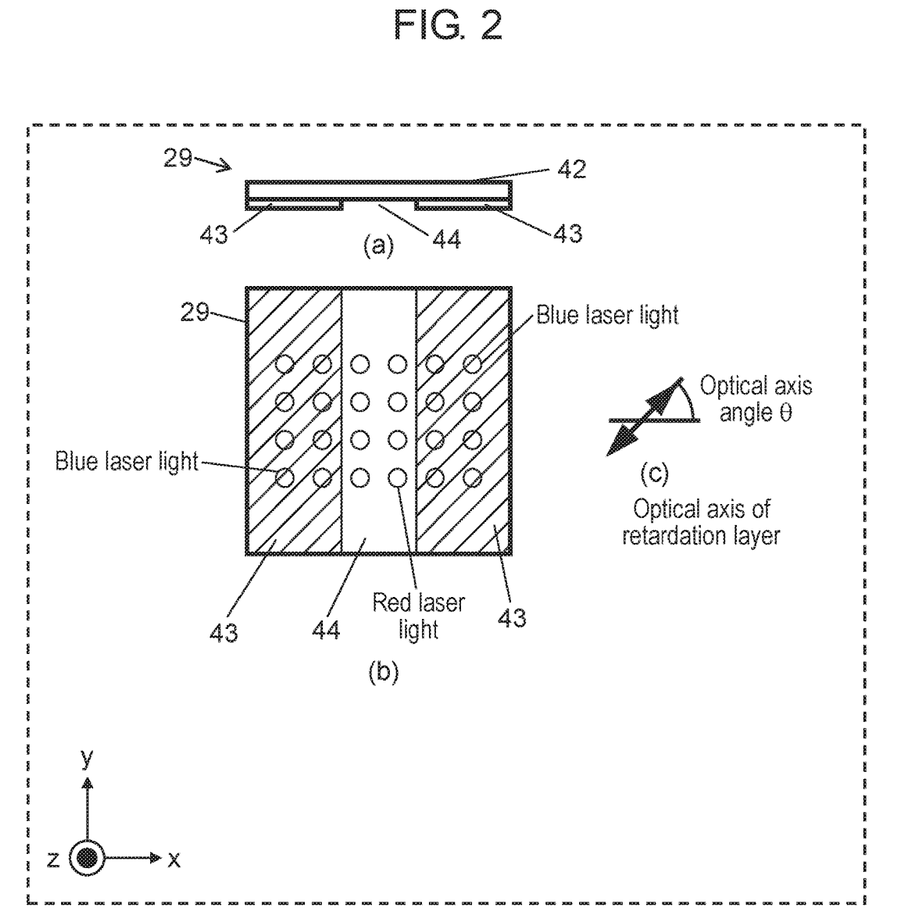
FIG. 2 is a block diagram of a first retardation plate in accordance with the first exemplary embodiment.

FIG. 2 shows the structure of first retardation plate 29, illustrating the state of blue laser light and red laser light that enter into first retardation plate 29. FIG. 2 (*a*) is a side view of retardation plate 29. FIG. 2 (*b*) is a plan view of the retardation plate of FIG. 2 (*a*). First retardation plate 29 has a microstructure formed on glass substrate 42, which produces a phase difference by birefringence. Such a retardation plate having a microstructure is described, for example, in International Patent Publication No. 2017-061170. In first retardation plate 29, glass substrate 42 has region 43 in which a retardation layer is formed and region 44 in which no retardation layer is formed. Region 43 having a retardation layer, which is a quarter wavelength plate, is formed at an incident area of blue laser light. A quarter wavelength plate has a phase difference of quarter wavelength in a region close to emission center wavelength of blue semiconductor laser 16.

As shown in FIG. 2 (*c*), first retardation plate 29 is disposed in such a way that optical axis angle θ of the retardation layer formed region is determined to approximately 63.5 degrees. By determining optical axis angle θ to 63.5 degrees, S-polarized (in the 90-degree direction) incident blue light has the polarization component ratio in which the P-polarized component to the S-polarized component is approximately 20% to 80%. Besides, the ratio of the P-polarized component to the S-polarized component of light can be adjusted by forming a rotation mechanism (of approximately ±5 degrees) to first retardation plate 29. The microstructure of first retardation plate 29 is made of inorganic material and manufactured by a nano-print method. Nano-printing makes it relatively easy to form region 43 (with a retardation layer) and region 44 (without a retardation layer) on the substrate. Like optical crystal, such as rock crystal, the inorganic material allows the structure to be highly durable and reliable. The P-polarized light fed from red solid-state light source unit 23 enters into region 44 having no retardation layer and therefore passes through the region as it is without polarization separation.

According to first retardation plate 29 described above, the retardation layer is partly formed on the glass substrate, but it is not limited to; the retardation layer may be formed entirely on the glass substrate. In that case, a plurality of retardation plates on which the retardation layer region is entirely formed is disposed at an incident position of blue laser light.

The P-polarized and S-polarized blue laser light and the P-polarized red laser light from first retardation plate 29 enter into dichroic mirror 30. That is, the light from blue solid-state light source unit 19 and the light from red solid-state light source unit 23 are fed into dichroic mirror 30 from an identical direction.

Figure 3:
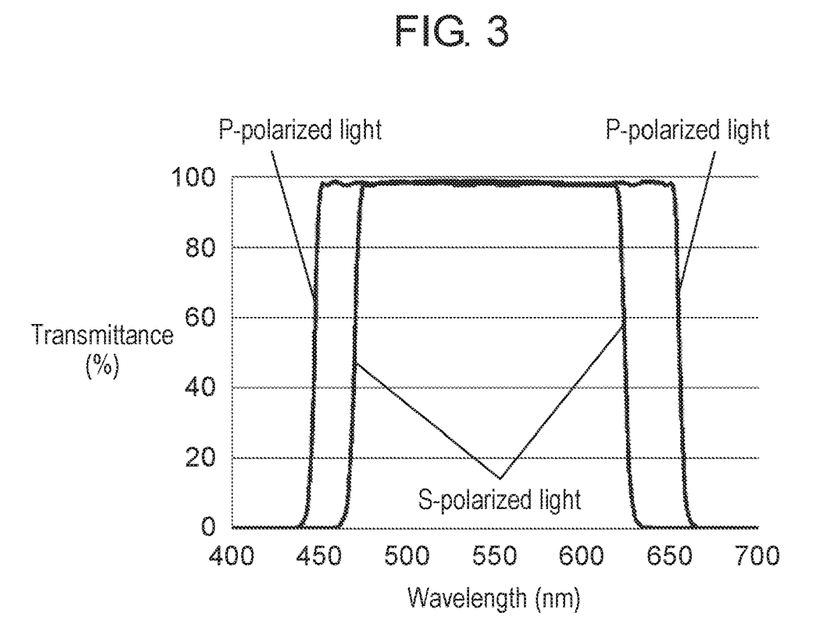
FIG. 3 shows spectral characteristics of a dichroic mirror.

FIG. 3 shows spectral characteristics of dichroic mirror 30. Spectral characteristics represent transmittance to wavelength. Dichroic mirror 30 has the following spectral characteristics. As for blue laser light in the wavelength range between 447 nm and 462 nm and as for red laser light in the wavelength range between 633 nm and 649 nm, P-polarized light passes through the mirror while S-polarized light reflects off the mirror at a high reflectance. As for the light including green and red in the wavelength range between 475 nm and 615 nm, P-polarized light and S-polarized light pass through the mirror at a high transmittance of 96% or more. Approximately 80% of S-polarized blue laser light reflected by dichroic mirror 30 is collected by condenser lenses 31, 32 and formed into a spot light with a spot diameter from 1.5 mm to 2.5 mm (where, the spot diameter is defined to be a diameter of light whose light intensity corresponds to 13.5% of the peak intensity). First diffusion plate 28 diffuses the light so as to have a desired spot diameter.

Phosphor plate 36 is a rotation-controllable circular plate. It has aluminum substrate 34 on which a reflection coating and phosphor layer 33 are formed and motor 35 in the center. The reflection coating of phosphor plate 36, which is a metallic coating or a dielectric coating that reflects visible light, is formed on aluminum substrate 34. Phosphor layer 33 is formed on the reflection coating. Phosphor layer 33 has a Ce-doped YAG yellow phosphor that emits yellow light containing green and red components when it is excited by blue laser light. The crystal matrix of the phosphor has $Y_3Al_5O_{12}$ as the typical chemical composition. Phosphor layer 33 is formed annularly. Phosphor layer 33 is excited by the spot light and emits yellow light containing green and red components. Employing an aluminum substrate and a rotatable structure for phosphor plate 36 suppresses temperature rise of phosphor layer 33 due to excitation light, which maintains stable fluorescence conversion efficiency.

The light fed into phosphor layer 33 causes fluorescent emission having green and red components and then goes out of phosphor plate 36. The light that has emission on the side of the reflection coating reflects off the coating and goes out of phosphor plate 36. The green and red light from phosphor plate 36 become natural light and is collected again by condenser lenses 31, 32. After converted into substantially parallel, the light passes through dichroic mirror 30.

P-polarized blue laser light and red laser light, which have passed through dichroic mirror 30, enter into quarter wavelength plate 37 as the second retardation plate. Quarter wavelength plate 37 is a wideband retardation plate that produces a phase difference of quarter wavelength in the wavelength range of the blue laser light and the red laser light. Quarter wavelength plate 37 is disposed with an optical axis angle of 45 degrees with reference to the P-polarization direction defined to 0 degree in FIG. 1. Quarter wavelength plate 37 converts the P-polarized blue laser light and red laser light into circularly-polarized light. Quarter wavelength plate 37 is a thin-film coating retardation plate formed of obliquely-deposited dielectric material to obtain birefringence. A thin-coating retardation plate is described, for example, in Japanese Unexamined Patent Application Publication No. 2012-242449. The structure—in which the retardation plate is formed of an obliquely-deposited coating—facilitates thick-coating forming; that is, a wideband quarter wavelength plate can be obtained. Besides, the thin-film coating retardation plate is formed of inorganic material. Like inorganic optical crystal, for example, rock crystal, the inorganic material allows the structure to be highly durable and reliable.

Quarter wavelength plate 37 converts incoming light into circularly-polarized light. Passing through quarter wavelength plate 37, the circularly-polarized light enters into condenser lens 38 and forms the focused spot at a position close to reflector 40. The light collected by condenser lens 38 enters into second diffusion plate 39. Second diffusion plate 39 diffuses incoming light, which not only provides uniform distribution of light intensity but also eliminates a speckle occurred in laser light. Second diffusion plate 39 has a diffusing surface of a microscopic lenticular structure formed on a glass substrate. The diffusion angle of second diffusion plate 39 is small (approximately 4 degrees) and maintains polarization characteristics. Reflector 40 has a reflection coating formed of aluminum or a dielectric multi-layer coating. Reflector 40 reflects the light coming from second diffusion plate 39. The light reflected by reflector 40 has phase inversion and travels as circularly-polarized light with an inverse rotation direction. After passing through second diffusion plate 39 again, the circularly-polarized light is collected by condenser lens 38 and converted into parallel light. After that, the light enters into quarter wavelength plate 37 and is converted into S-polarized light. Having undergone polarization conversion in quarter wavelength plate 37, the S-polarized blue laser light and red laser light reflect off dichroic mirror 30.

Through the process above, the fluorescence light coming from phosphor plate 36 and the effectively polarized blue laser light and red laser light are combined at dichroic mirror 30 and goes out of the mirror as white light.

Figure 4:
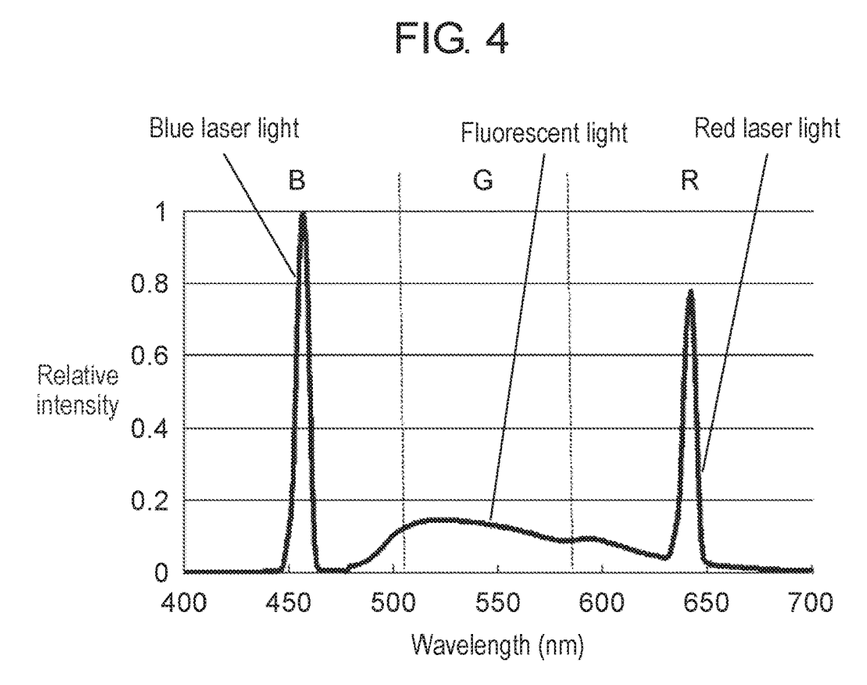
FIG. 4 shows a spectral characteristic diagram of the light fed from the light source device.

FIG. 4 shows a spectral characteristic diagram of the light fed from light source device 41. Separating the range by color, as shown by broken lines in FIG. 4, allows the three primary colors (blue, green, and red) to have high color purity.

Fluorescence light containing green and red components, blue laser light, and red laser light provide preferable light-emission characteristics, for example, high color purity of the three primary colors (of blue, green, and red), wide color gamut, and properly-adjusted white balance. According to the light-emission spectral characteristics, even when the color separation into three primary color lights of blue, green, red is performed by the optical system of the projection display apparatus, high color-purity monochromatic light can be obtained.

In the description, a microstructured retardation plate is employed for the first retardation plate, it is not limited to; a thin-film coating retardation plate or crystal may be used. Further, the first retardation plate has been described as a quarter wavelength plate. When the device employs a component layout in which the blue semiconductor laser emits P-polarized blue laser light, the P-polarized light has to be changed so as to have polarization component ratio of the P-polarized component of approximately 20% to the S-polarized component of approximately 80%. In that case, a half wavelength plate is employed for the first retardation plate.

In the description, a thin-film coating retardation plate is employed for the second retardation plate, it is not limited to; a microstructured retardation plate or crystal may be used.

In the description, light source device 41 employs two blue solid-state light source units 19 and single red solid-state light source unit 23. When the light source device employs a structure in which the blue laser light and the red laser light are separated on the first retardation plate, the device may have two-or-more solid-state light source units for each of blue-light emission and red-light emission.

As described above, the light source device of the present disclosure has a retardation plate that applies a phase difference to the light fed from a blue solid-state light source. With the structure above, light fed from a blue solid-state light source and a red solid-state light source can be collected and combined by a single optical system. This allows the light source device to have a compact body, the three primary colors (blue, green, red) with high color purity, and preferable white light with wide color gamut.

Second Exemplary Embodiment

Figure 5:
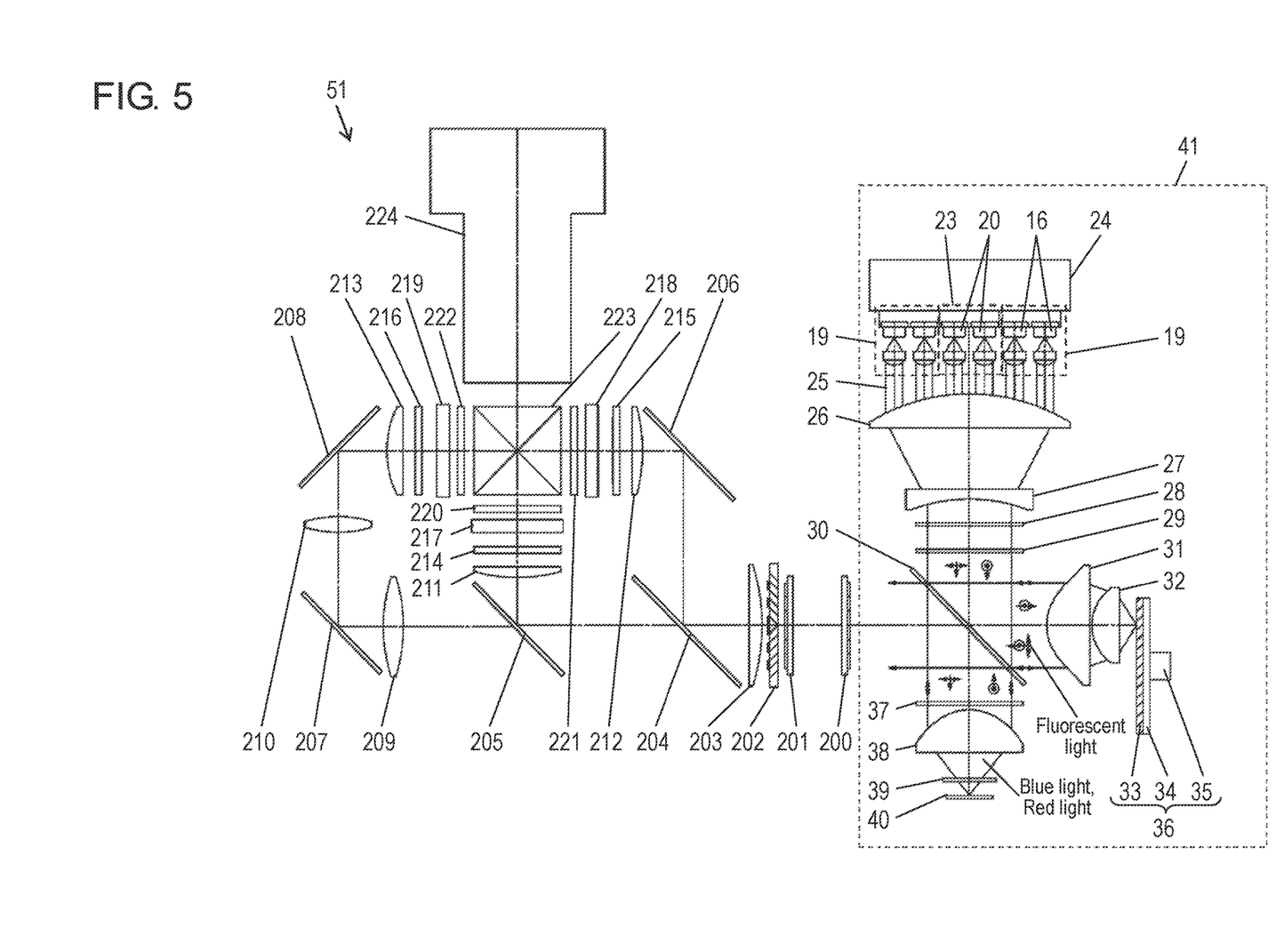
FIG. 5 is a block diagram of a projection display apparatus in accordance with a second exemplary embodiment.

FIG. 5 is a block diagram of first projection display apparatus 51 of the second exemplary embodiment. The device of the embodiment has a transmissive liquid crystal panel for image forming means. The liquid crystal panel has a structure in which a thin-coating transistor is formed in a pixel region and is driven by the TN (twisted nematic) mode or the VA (vertical alignment) mode of an active matrix method.

Light source device 41 of the embodiment has the following components, as is the same with light source device 41 of the first exemplary embodiment: blue semiconductor laser 16, red semiconductor laser 20, blue solid-state light source unit 19, red solid-state light source unit 23, heatsink 24, lenses 26 and 27, first diffusion plate 28, first retardation plate 29, dichroic mirror 30, condenser lenses 31 and 32, phosphor plate 36, quarter wavelength plate 37 as a second retardation plate, condenser lens 38, second diffusion plate 39, and reflector 40.

Light fed from light source device 41 travels to projection lens 224 via the optical system formed of the following components: first lens array plate 200, second lens array plate 201, polarization conversion element 202, superposition lens 203, blue-light reflective dichroic mirror 204, green-light reflective dichroic mirror 205, reflective mirrors 206, 207, 208, relay lenses 209, 210, field lenses 211, 212, 213, incoming-side polarizers 214, 215, 216, liquid crystal panels 217, 218, 219, outgoing-side polarizers 220, 221, 222, and color combining prism 223 formed of a red-light reflective dichroic mirror and a blue-light reflective dichroic mirror.

White light fed from light source device 41 enters into first lens array plate 200 formed of a plurality of lens elements. Through first lens array plate 200, the light is separated into fluxes and the fluxes converge on second lens array plate 201 formed of a plurality of lens elements. Each lens element of first lens array plate 200 has an aperture shape, which is similar in shape to liquid crystal panels 217, 218, 219. The focal point distance of the lens elements of second lens array plate 201 is determined so that first lens array plate 200 is substantially conjugated with liquid crystal panels 217, 218, 219. The light fed from second lens array plate 201 enters into polarization conversion element 202.

Polarization conversion element 202, which is formed of a polarization separating prism and a half wavelength plate, converts the natural light fed from the light source into the light polarized in a single direction. Fluorescence light, which belongs to natural light, is converted into the light polarized in a single direction. In contrast, blue light, which comes into polarization conversion element 202 as the P-polarized light, is converted into the S-polarized light. The light from polarization conversion element 202 enters into superposition lens 203. Superposition lens 203 applies the light coming from each lens element of second lens array plate 201 onto liquid crystal panels 217, 218, 219 for illuminating. First lens array plate 200, second lens array plate 201, polarization conversion element 202, and superposition lens 203 form an illumination optical system.

The light coming from superposition lens 203 is separated into blue light, green light, and red light by the color separator means, i.e., blue-light reflective dichroic mirror 204 and green-light reflective dichroic mirror 205. Green light passes through field lens 211 and incoming-side polarization plate 214 and enters into liquid crystal panel 217. Blue light reflects off reflective mirror 206, then passes through field lens 212, incoming-side polarization plate 215, and enters into liquid crystal panel 218. Red light refractively passes relay lenses 209, 210 and reflects off reflective mirrors 207, 208, passes through field lens 213 and incoming-side polarization plate 216, and then enters into liquid crystal panel 219.

Through control of application voltage to pixels in response to image signals, three liquid crystal panels 217, 218, 219 change the polarization state of incident light. Incoming-side polarization plates 214, 215, 216 and outgoing-side polarization plates 220, 221, 222 are disposed, in a direction perpendicular to the transmission axis, on the both sides of crystal panels 217, 218, 219, respectively. Each of the liquid crystal panels modulates light by combination use of the respective incoming-side polarization plate and outgoing-side polarization plate so as to form an image of each color. Passing through outgoing-side polarization plates 220, 221, and 222, the light of each color enters into color combining prism 223. Red light reflects off the red-light reflective dichroic mirror and blue light reflects off the blue-light reflective dichroic mirror and they are combined with green light. The combined light enters into projection lens 224 and is magnified and projected onto a screen (not shown).

Having a compact structure with use of a blue solid-state light source and a red solid-state light source, the light source device emits white light with high color purity and properly-adjusted white balance. Accordingly, this allows the projection display apparatus to have a compact body and wide color gamut. Besides, the image forming means employ three liquid crystal panels with use of polarization, not a time-division driving system. The structure offers good color reproduction with no color breaking, producing projection images with high luminance and high definition. Compared to a structure employing three DMDs, the structure of the embodiment allows the projection display apparatus to be downsized because of employing a compact prism of 45-degree-incidence for color combining instead of using a total internal reflection prism.

As is described above, first projection display apparatus 51 of the present disclosure has a blue solid-state light source, a red solid-state light source, first retardation plate that controls the polarization components of light fed from the blue solid-state light source so as to have a predetermined ratio, and a dichroic mirror for polarization separation. Further, the projection display apparatus employs a light source device capable of collecting and combining the light from the blue solid-state light source and the red solid-state light source by a single optical system. This allows the projection display apparatus to have a compact body and wide color gamut.

Although the structure of the embodiment employs a transmissive liquid crystal panel for the image forming means, a reflective liquid crystal panel may be used. Reflective liquid crystal panel allows the projection display apparatus to have smaller size and higher definition than the transmissive liquid crystal panel.

Third Exemplary Embodiment

Figure 6:
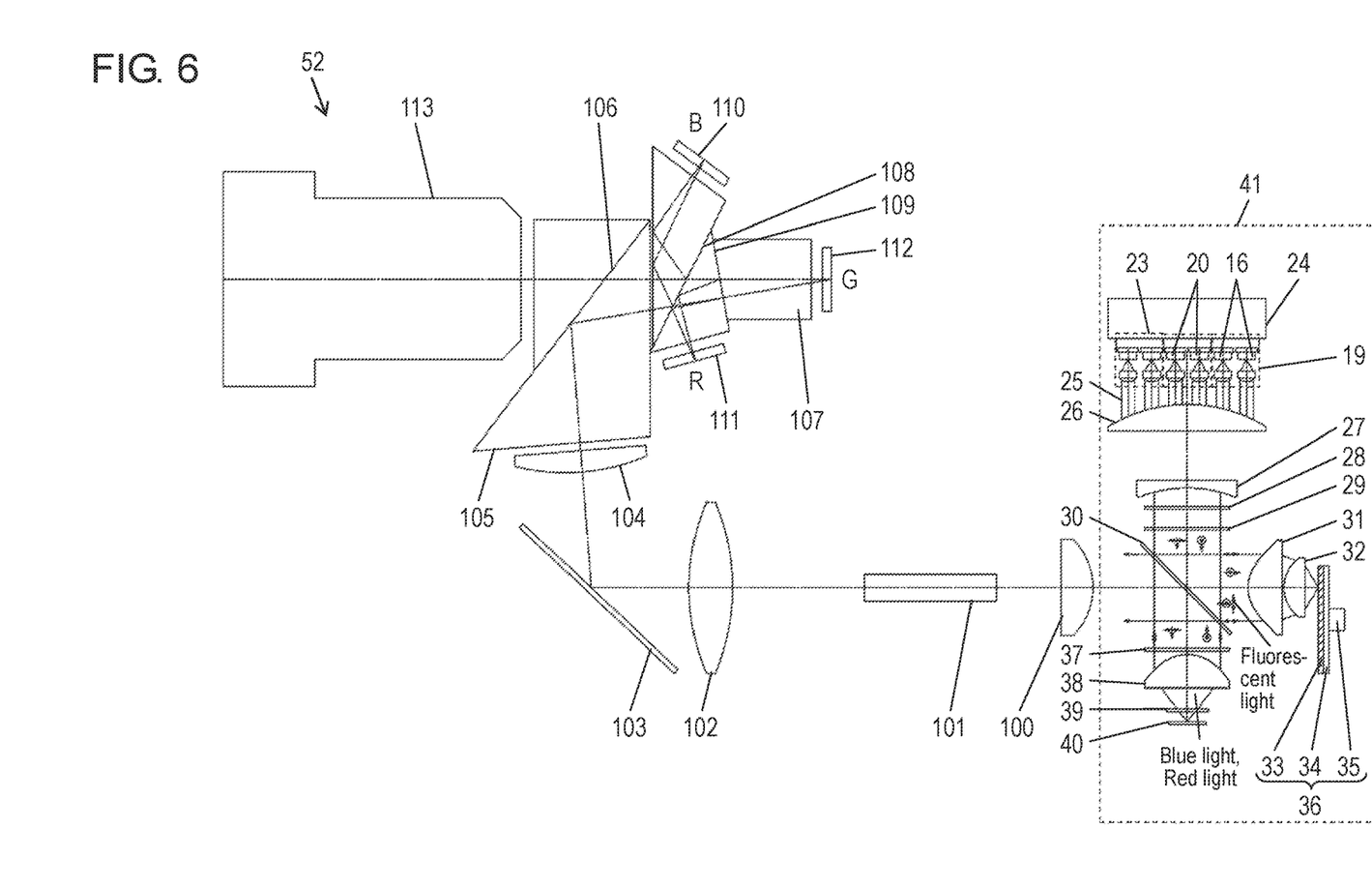
FIG. 6 is a block diagram of a projection display apparatus in accordance with a third exemplary embodiment.

FIG. 6 is a block diagram of second projection display apparatus 52 of the third exemplary embodiment. The structure employs three DMDs (digital micromirror devices) for the image forming means.

Light source device 41 of the embodiment has the following components, as is the same with light source device 41 of the first exemplary embodiment: blue semiconductor laser 16, red semiconductor laser 20, blue solid-state light source unit 19, red solid-state light source unit 23, heatsink 24, lenses 26 and 27, first diffusion plate 28, first retardation plate 29, dichroic mirror 30, condenser lenses 31 and 32, phosphor plate 36, quarter wavelength plate 37 as a second retardation plate, condenser lens 38, second diffusion plate 39, and reflector 40.

White light fed from light source device 41 enters into collection lens 100 and is collected into rod 101. While reflecting repeatedly in rod 101, the light has uniform light-intensity distribution. The light goes out of rod 101 and is collected by relay lens 102. After reflecting off reflective mirror 103, the light passes through field lens 104 and enters into total internal reflection prism 105. Total internal reflection prism 105 is formed of two prisms, and thin air layer 106 is formed on a plane adjacent to each prism. Air layer 106 totally reflects the incident light with an angle greater than the critical angle. The light coming from field lens 104 reflects off the total internal reflection surface of total internal reflection prism 105 and then enters into color prism 107.

Color prism 107 is formed of three prisms. On a plane adjacent to each prism, blue-light reflective dichroic mirror 108 and red-light reflective dichroic mirror 109 are formed, by which the light is separated into light of blue, red, and green. Each light of blue, red, and green enters into DMDs 110, 111, and 112, respectively. In response to an image signal, DMDs 110, 111, 112 deflect the micromirror so as to reflect the light and separate the traveling direction into two: one enters into projection lens 113, and the other travels to the outside of the effective diameter of projection lens 113. The light reflected by DMDs 110, 111, 112 passes through color prism 107 again. While passing through color prism 107, the blue light, the green light, and the red light, which have been separated from each other, are combined and enter into total internal reflection prism 105.

The light passes through air layer 106, because whose incident angle being smaller than the critical angle, and enters into projection lens 113. Through the process above, the image light formed by DMDs 110, 111, 112 is magnified and projected onto the screen (not shown).

Employing a blue solid-state light source and a red solid-state light source, the light source device of the embodiment has a compact body and emits white light with high color purity and properly-adjusted white balance. Accordingly, the structure allows a projection display apparatus to be downsized and to have wide color gamut. Besides, the structure of the embodiment employs DMDs for the image forming means. Compared to image forming means using liquid crystal, the image forming means of DMDs provides the projection display apparatus with high resistance to light and heat. Further, employing three DMDs allows projection images to have good color reproduction and high luminance and high definition.

As is described above, second projection display apparatus 52 of the present disclosure has a blue solid-state light source, a red solid-state light source, first retardation plate that controls the polarization components of light fed from the blue solid-state light source so as to have a predetermined ratio, and a dichroic mirror for polarization separation. Further, the projection display apparatus employs a light source device capable of collecting and combining the light from the blue solid-state light source and the red solid-state light source by a single optical system. This allows the projection display apparatus to have a compact body and wide color gamut.

INDUSTRIAL APPLICABILITY

The present disclosure relates to a projection display apparatus that employs a liquid crystal panel and a DMD as the image forming means.

What is claimed is:

1. A light source device comprising:
   a blue solid-state light source;
   a red solid-state light source;
   a first retardation plate that causes light from the blue solid-state light source to have a phase difference;
   a dichroic mirror that provides the light from the blue solid-state light source with polarization separation, receiving the light from the blue solid-state light source and light from the red solid-state light source in an identical direction;
   a phosphor plate that emits fluorescence light, excited by one light, separated by the dichroic mirror, of the light from the blue solid-state light source;
   a second retardation plate that converts, into circular polarization, polarization of the light from the red solid-state light source and other light, separated by the dichroic mirror, of the light from the blue solid-state light source; and
   a reflector that reflects light converted into circular polarization by being passed through the second retardation plate.

2. The light source device according to claim 1, wherein the dichroic mirror combines the fluorescence light from the phosphor plate and the light reflected by the reflector.

3. The light source device according to claim 1, wherein the first retardation plate is a quarter wavelength plate or a half wavelength plate.

4. The light source device according to claim 1, wherein the first retardation plate has a structure in which a region having a retardation layer and a region having no retardation layer are formed on a glass substrate.

5. The light source device according to claim 1, wherein the first retardation plate has a rotation adjustment mechanism.

6. The light source device according to claim 1, wherein the second retardation plate is a quarter wavelength plate that causes quarter phase difference in a wavelength of the light from the blue solid-state light source and the light from the red solid-state light source.

7. The light source device according to claim 1, wherein the first retardation plate and the second retardation plate are microstructured retardation plates each using birefringence by the microstructure.

8. The light source device according to claim 1, wherein the first retardation plate and the second retardation plate are thin-film coating retardation plates each using birefringence by oblique deposition.

9. The light source device according to claim 1, wherein the blue solid-state light source is a blue semiconductor laser.

10. The light source device according to claim 1, wherein the red solid-state light source is a red semiconductor laser.

11. The light source device according to claim 1, wherein the light from the blue solid-state light source and the light from the red solid-state light source are linearly-polarized light.

12. The light source device according to claim 1, wherein the phosphor plate is a rotation-controllable circular plate and has a phosphor layer in which a Ce-doped YAG yellow phosphor containing green and red components is formed.

13. A projection display apparatus comprising:
    the light source device described in claim 1;
    an illumination optical system that collects light from the light source device and illuminates a region to be illuminated with the light;
    an image forming element that forms an image in response to an image signal; and
    a projection lens that magnifies and projects the image formed by the image forming element.

14. The projection display apparatus according to claim 13, wherein the image forming element is a liquid crystal panel.

15. The projection display apparatus according to claim 13, wherein the image forming element is a mirror-deflection digital micromirror device (DMD).

* * * * *